J. GIBSON.
SEED PLANTER.
APPLICATION FILED MAY 14, 1912.

1,102,038.

Patented June 30, 1914.
3 SHEETS—SHEET 1.

Witnesses
W. H. Mulligan.

Inventor
John Gibson
By Victor J. Evans.
Attorney

COLUMBIA PLANOGRAPH CO., WASHINGTON, D. C.

J. GIBSON.
SEED PLANTER.
APPLICATION FILED MAY 14, 1912.

1,102,038.

Patented June 30, 1914.

3 SHEETS—SHEET 2.

Witnesses
W. H. Mulligan.

Inventor
John Gibson
By Victor J. Evans.
Attorney

COLUMBIA PLANOGRAPH CO., WASHINGTON, D. C.

J. GIBSON.
SEED PLANTER.
APPLICATION FILED MAY 14, 1912.

1,102,038.

Patented June 30, 1914.
3 SHEETS—SHEET 3.

Inventor
John Gibson.

Witnesses

By Victor J. Evans.
Attorney

UNITED STATES PATENT OFFICE.

JOHN GIBSON, OF COURTENAY, NORTH DAKOTA.

SEED-PLANTER.

1,102,038.

Specification of Letters Patent.   Patented June 30, 1914.

Application filed May 14, 1912.   Serial No. 697,336.

*To all whom it may concern:*

Be it known that I, JOHN GIBSON, a citizen of the United States, residing at Courtenay, in the county of Stutsman and State of North Dakota, have invented new and useful Improvements in Seed-Planters, of which the following is a specification.

This invention relates to seed planters and it has particular reference to that class of seed planters which are adapted to sow the seed in drills.

The invention has for its object to produce a device of this class which will be simple in construction and efficient in operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited but that changes, alterations, and modifications within the scope of the appended claims may be made when desired.

Figure 1:
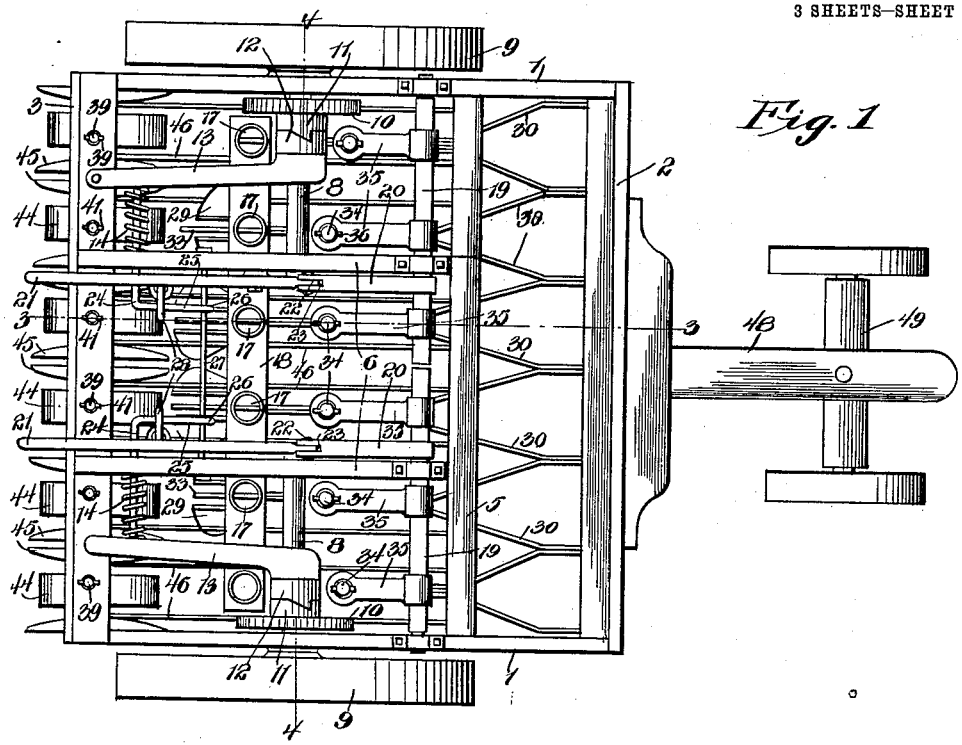
Figure 3:
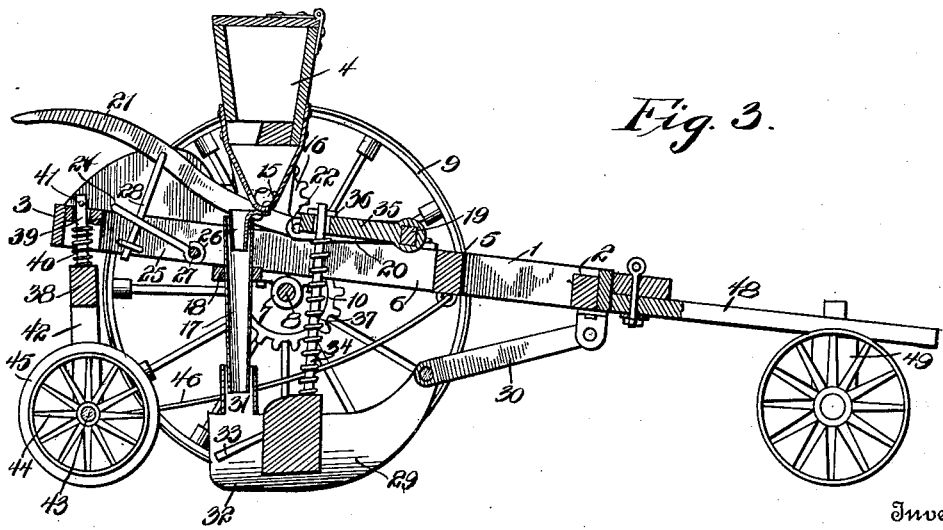
Figure 2:
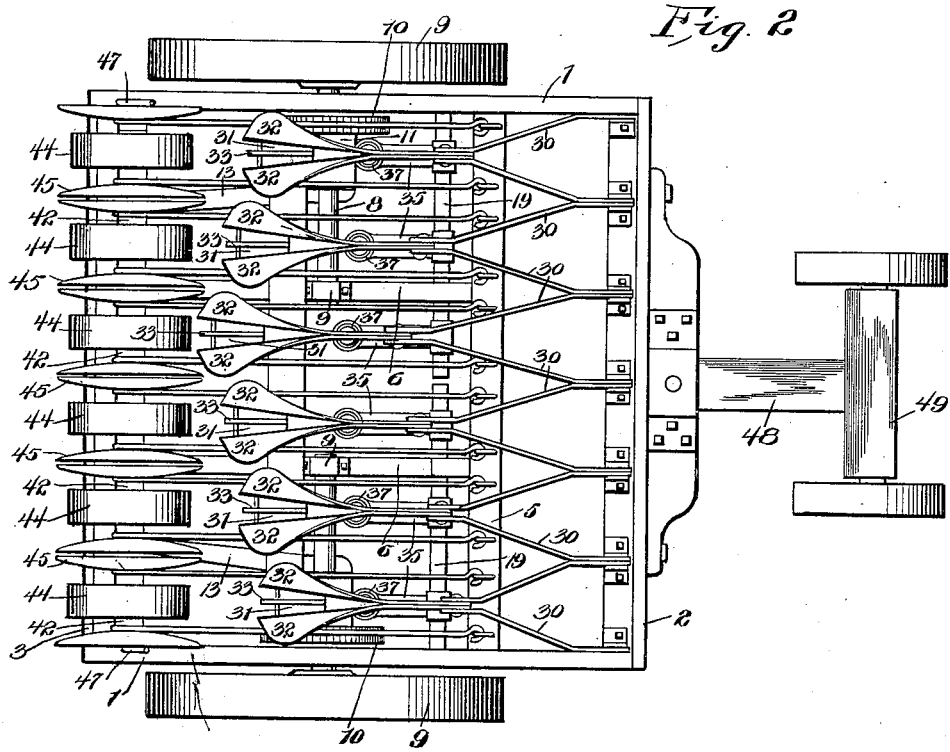
Figure 6:
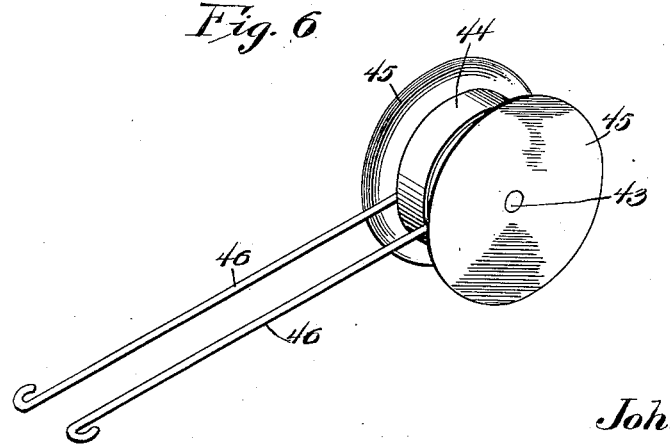
Figure 4:
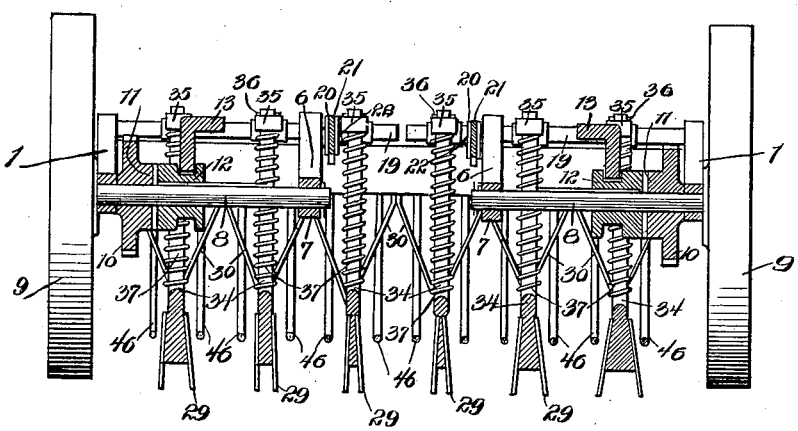
Figure 5:
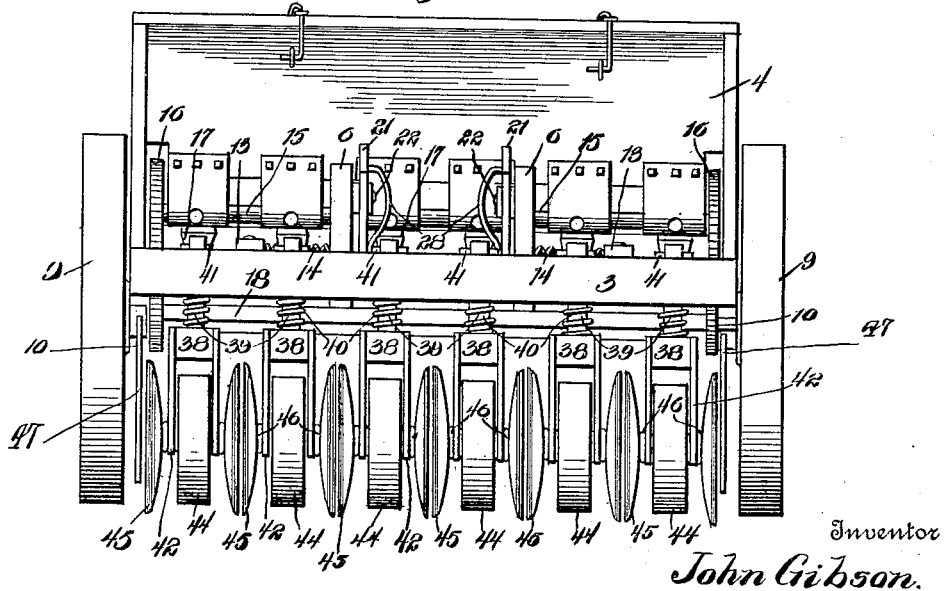

In the drawings, Figure 1 is a top plan view of a machine constructed in accordance with the invention, parts having been removed for the purpose of exposing subjacent construction. Fig. 2 is a bottom plan view of the same. Fig. 3 is a longitudinal vertical sectional view taken on the line 3—3 in Fig. 1. Fig. 4 is a transverse sectional view taken on the line 4—4 in Fig. 1. Fig. 5 is a rear elevation. Fig. 6 is a perspective view of one of the units of the covering and packing device.

Corresponding parts in the several figures are denoted by like characters of reference.

The frame of the improved machine which is preferably rectangular in shape includes the side members 1—1, the front cross bar 2 and the rear cross bar 3. The seed box 4 is supported on the side members of the frame and the frame is provided intermediate the front cross bar 2 and the seed box with a cross bar 5 which is connected with the rear cross bar 3 by means of longitudinal braces 6. Said braces 6 together with the side members of the frame are provided with boxes 7 affording bearings for two separate axle members 8 each carrying a transporting wheel 9. The axle members are equipped with spur wheels 10, the hubs of which have clutch members 11 adapted to be engaged by clutch members 12 that are slidably mounted on the axle members 8. The clutch members 12 are engaged by shipping levers 13 that are fulcrumed on the rear cross bar of the frame and which are actuated by springs 14 interposed between the levers and the longitudinal braces 6 and the tension of which is exerted to hold the slidable clutch members 12 normally in engagement with the clutch members 11 of the spur wheels 10 which are supported loosely on the axle members. It will be understood that the transporting wheels are to be fixedly secured on the axle members and that the clutch members 12 are to be associated with the axle members for rotation therewith; hence the spur wheels 10 will be normally locked by the interengaging clutch members 11—12 upon the axle members for rotation therewith, while by actuating the shipping levers against the tension of the springs 14 the clutch members will be thrown out of engagement, and the spur wheels will be free to rotate idly on the axle members.

The seed box 4 is divided about midway of its length into two separate compartments each equipped with seed dropping mechanism of ordinary conventional construction which need not be described or illustrated in detail as it does not constitute part of the present invention. The dropping mechanism in each compartment is actuated by a shaft 15 having a pinion 16 meshing with one of the spur wheels 10. The seed escapes from the seed box into the spouts or ducts 17 which are supported partly by the seed box and partly by a cross bar 18 which may be attached to and supported by the longitudinal braces 6.

The side members of the frame and the longitudinal braces 6 afford bearings for rock shafts 19 which are supported directly in rear of the cross bar 5 and each of which has a rearwardly extending arm 20. Fulcrumed upon each of the longitudinal braces 6 is a lever 21, the forwardly extending arm of which is pivotally connected with the rearwardly extending arm 20 of the proximate rock shaft 19, the pivotal connection including a pin 22 operating in a slot 23 in the forwardly extending arm of the lever, thereby enabling the latter to be utilized for rocking the shaft 19. Each of the shipping levers 13 has a laterally extending rod 24 which is guided through the proximate brace 6 and bent to form a shoe 25 having a terminal eye 26 which is guided on a suitable guide rod 27. The levers 21, which are fulcrumed upon the inner faces of the braces 6, in counterdistinction to the shipping levers which are disposed intermediate said braces and the side members of the frame, are each provided with a pivotally supported cam member 28 which is guided between the inner face of the brace upon which the lever is fulcrumed and the shoe 25 of the rod 24 associated with the shipping lever between such brace and the proximate side member of the frame. The construction is such that by depressing the rearwardly extending arm of the lever 21, lateral pressure will be exerted against the shoe 25, thereby pulling the shipping lever 13 against the tension of the spring 14 with the result of disengaging the clutch member 12 controlled by such shipping lever from its mating member 11. When the rearwardly extending arm of the lever 21 is moved in an upward direction, the parts will be restored to engaging position by the action of the spring 14.

For the purpose of opening furrows for the reception of seed, the runners or furrow openers 29 are provided said runners being provided with forwardly extending arms 30 which are pivotally supported upon the underside of the front cross bar 2 of the frame. The rear ends of the runners are provided with seed spouts 31 arranged to receive the seed discharged through the spouts or ducts 17 of the seed box, and said runners are also equipped with furrow opening wings 32 which diverge laterally below the seed spouts 31 the lower ends of which discharge between said wings. Each runner is also provided intermediate the wings 32 and directly in the path of material which is being discharged through the spout 31, with an obstructing member which may be in the nature of a rod 33 whereby the seeds falling from the spout 31 will be scattered throughout the width of the furrow. It will be noted that the furrow opening wings are to be of such shape and dimensions as to form a flat bottomed furrow of relatively great width, thus enabling the seeds to be scattered over considerable area instead of being condensed in the bottom of a relatively narrow ditch-like furrow as is now ordinarily the case. Each of the runners is provided with an upwardly extending stem 34 guided through an arm 35 that extends rearwardly from one of the rock shafts 19, it being observed that each of said rock shafts controls one-half of the runners. Each runner stem is provided above the arm 35 through which it extends, with a stop member 36, and a spring 37 which is coiled above the runner stem beneath the arm 35 serves to press the runner in the direction of the ground or downwardly with reference to the arm with which it is associated.

It will be seen from the foregoing that when the rearwardly extending arms of the levers 21 are elevated, and the clutch members 11 and 12 are in engagement, the runners will be depressed into engagement with the ground by the action of the rock shafts 19 which are actuated by the forwardly extending arms of the levers 21, thus opening furrows for the reception of seed coming from the seed box. When the rearwardly extending arms of the levers 21 are depressed, the runners will be elevated from the ground and the clutch members 11 and 12 will be thrown out of engagement, thus interrupting the formation of furrows as well as the discharge of seed from the box, and consequently throwing the machine out of operation.

Arranged directly in rear of each runner or furrow opener is a covering and soil packing device which includes a block 38 having an upwardly extending stem 39 which is guided through the rear cross bar 3 of the frame, said block being forced downwardly by the action of a spring 40 which is coiled about the stem between the block and the cross bar, and the stem being provided above the cross bar 3 with a stop member 41 to limit the downward movement thereof. Each of the blocks 38 is provided with downwardly extending limbs 42 affording bearings for a shaft or axle 43 carrying, between the limbs 42, a soil packing wheel 44 having a relatively broad flat rim to engage and pack the dirt. The shaft 43 also carries at the ends thereof, adjacent to the outer faces of the limbs 42, a pair of disks 45 having convex inner faces and serving to force or compress the soil in the direction of the packing wheel 44 and also to some extent to cut into the soil with the effect of destroying the roots of such weeds as may already have sprouted and eliminating undesirable vegetation. The shafts or axles 43 of the several packing devices are provided with forwardly extending draft rods 46 which are pivotally connected with the underside of the cross bar 5 of the frame. These packing devices, it will be observed, operate in rear of the runners or furrow openers with the effect of restoring the soil excavated from the trench which is formed to receive the seed, thus covering the seeds and packing the soil in such a manner as to retain moisture and obtaining the most favorable conditions for germination and growth.

The packing devices, it will be observed, operate independently of one another, each device being supported loosely and independently. In order to maintain the entire set of packing devices in alinement with the furrow openers, the frame structure of the machine is provided at the rear corners thereof with depending rods or brackets 47 lying in the path of the outermost packing devices, thereby preventing outward or lateral displacement.

The machine has been shown as being provided with a forwardly extending tongue or draft member 48 supported on a tongue truck 49 to which draft may be applied but which may be readily detached from this machine for the purpose of using it in connection with some other implement.

From the foregoing description taken in connection with the drawings hereto annexed, the operation and advantages of this invention will be readily understood by those skilled in the art to which it appertains, the construction of the improved seed planter is simple, and it will, in operation, be found to be thoroughly efficient for the purposes for which it is provided.

Having thus described the invention, what is claimed as new, is:—

1. In a seed planter, a frame including a cross bar, packing devices each comprising a block having a stem extending upwardly through the frame and downwardly extending limbs, a spring coiled about the stem beneath the frame, a stop member on the stem above the frame, a shaft supported for rotation in the limbs, a packing wheel on said shaft between the limbs, disks on said shaft adjacent to the outer faces of the limbs and having convex inner faces, and draft members connected at their rear ends with the shaft and at their front ends with the cross bar of the frame.

2. In a seed planter, a frame, wheel carrying axles supported for rotation, a spur wheel supported loosely on each axle member, each of said spur wheels having a fixed clutch member, clutch members slidable on the axle members connected therewith for rotation and adapted to engage the clutch members of the spur wheels, seed drop controlling shafts having pinions meshing with the spur wheels, spring actuated shipping levers controlling the slidable clutch members and holding them normally in engagement with the clutch members of the spur wheels, rock shafts having rearwardly extending arms, runners connected pivotally with the front of the frame and having stems that extend upwardly through the arms of the rock shafts, said stems having stop members above the arms and springs coiled about the stems below the arms of the rock shafts, longitudinal braces on the frame, rods connected with the shipping levers and guided through the braces, said rods having the actuating springs of the shipping levers coiled thereon, and said rods being provided with shoes having terminal eyes, a guide rod for said eyes, levers fulcrumed on the longitudinal braces and having pivoted cam members guided between the braces and the shoes, and crank arms extending rearwardly from the rock shafts and connected pivotally with the levers, the operation of the latter serving to simultaneously actuate the rock shafts and the shipping levers.

In testimony whereof I affix my signature in presence of two witnesses.

JOHN GIBSON.

Witnesses:
GEO. E. BRASTRUP,
H. N. TUCKER.

---

Copies of this patent may be obtained for five cents each, by addressing the "Commissioner of Patents, Washington, D. C."